US008468578B1

(12) United States Patent
Lu et al.

(10) Patent No.: US 8,468,578 B1
(45) Date of Patent: Jun. 18, 2013

(54) ESTABLISHING ACCESS CONTROLS IN A PREMISE-BASED ENVIRONMENT

(75) Inventors: Larry L. Lu, Great Falls, VA (US); Patrick Meenan, Gainesville, VA (US)

(73) Assignee: AOL Inc., Dulles, VA (US)

( * ) Notice: Subject to any disclaimer, the term of this patent is extended or adjusted under 35 U.S.C. 154(b) by 2115 days.

(21) Appl. No.: 10/330,542

(22) Filed: Dec. 30, 2002

(51) Int. Cl.
  *G06F 7/04* (2006.01)
(52) U.S. Cl.
  USPC .......... 726/2; 726/1; 726/4; 726/26; 713/155; 713/168; 713/170
(58) Field of Classification Search
  USPC ........ 726/2, 7, 18, 19, 12, 1, 4, 5, 26; 705/54; 713/166, 155, 168, 170
  See application file for complete search history.

(56) References Cited

U.S. PATENT DOCUMENTS

| 5,945,988 | A | 8/1999 | Williams et al. | |
|---|---|---|---|---|
| 6,510,350 | B1 * | 1/2003 | Steen et al. | 700/9 |
| 6,564,327 | B1 * | 5/2003 | Klensin et al. | 726/7 |
| 7,155,435 | B1 * | 12/2006 | Day et al. | 715/751 |
| 2001/0049790 | A1 * | 12/2001 | Faccin et al. | 713/185 |
| 2002/0049806 | A1 * | 4/2002 | Gatz et al. | 709/203 |
| 2004/0003071 | A1 * | 1/2004 | Mathew et al. | 709/223 |
| 2004/0051733 | A1 * | 3/2004 | Katzir | 345/741 |
| 2006/0253330 | A1 * | 11/2006 | Maggio et al. | 705/14 |

* cited by examiner

*Primary Examiner* — Aravind Moorthy
*Assistant Examiner* — Joseph Pan
(74) *Attorney, Agent, or Firm* — Finnegan, Henderson, Farabow, Garrett & Dunner LLP

(57) ABSTRACT

Establishing access controls includes establishing a communication session between an unrecognized user identity of a user device and a destination system through an online access provider device that provides the user device with access to the destination system. The communication session is established from a premise having associated therewith one or more user identities that are recognized by the online access provider device, with at least two of the recognized user identities being associated with different access control levels. An access control level to apply to communications between the unrecognized user identity of the user device and the destination system is determined by applying an access control level established for one of the recognized user identities. The determined access control level is applied to communications between the unrecognized user identity of the user device and the destination system.

90 Claims, 7 Drawing Sheets

ESTABLISHING ACCESS CONTROLS IN A PREMISE-BASED ENVIRONMENT

TECHNICAL FIELD

This document relates to establishing access controls in a premise-based environment.

BACKGROUND

At a premise that includes more than one user identity, with some of the user identities being recognized and others being unrecognized, access controls may be associated with either or both on a local or remote level.

SUMMARY

In one general aspect, establishing access controls includes establishing a communication session between an unrecognized user identity of a user device and a destination system through an online access provider device that provides the user device with access to the destination system. The communication session is established from a premise having associated therewith one or more user identities that are recognized by the online access provider device, with at least two of the recognized user identities being associated with different access control levels. An access control level to apply to communications between the unrecognized user identity of the user device and the destination system is determined by applying an access control level established for one of the recognized user identities. The determined access control level is applied to communications between the unrecognized user identity of the user device and the destination system.

Implementations may include one or more of the following features. For example, a most restrictive access control level from among the access control levels that are associated with the recognized user identities may be determined and the access control level to apply to communications between the unrecognized user identity of the user device and the destination system may be determined by selecting the determined most restrictive access control level. The most restrictive access control level may be updated automatically to reflect changes made to the access control levels for at least a corresponding one of the recognized user identities.

A least restrictive access control level from among the access control levels that are associated with the recognized user identities may be determined and the access control level to apply to communications between the unrecognized user identity of the user device and the destination system may be determined by selecting the determined least restrictive access control level.

The access control level to apply may be determined by selecting at least two access control levels from among the access control levels applied to the recognized user identities. The access control level may be changed automatically as the access control levels are changed for the recognized user identities. The access control levels for the recognized user identities may be changed from one level of classification to a different level of classification. The access control levels for the recognized user identities may be changed from one level of classification of content to a different level of classification of content based on age-appropriateness of the content.

The access control levels may include parental control levels.

The destination system may include a host system and determining the access control level to apply includes determining the access control level to apply at the host system. In one implementation, the online access provider device may be distinct from the destination system. In another implementation, the online access provider device may be related to the destination system. The online access provider device may include an Internet access provider device, an Internet service provider device, and/or a gateway server.

The communication session between the unrecognized user identity and the destination system may be established through a proxy located between software at the user device that initiates the communication session and the online access provider device. The access control level to apply may be determined at the proxy. The proxy may include a home gateway device and/or a client-side proxy. In one implementation, the proxy may be located on the user device. Access control information may be stored on the proxy. The access control information may include parental control information that is stored on the proxy. The proxy may be used to apply the determined access control level to communications between the unrecognized user identity of the user device and the destination system. Access control information may be appended to communications between the unrecognized user identity of the user device and the destination system. A most restrictive access control level from among the access control levels that are associated with the recognized user identities may be determined at the proxy and the access control level to apply to communications between the unrecognized user identity of the user device and the destination system may be determined by selecting the determined most restrictive access control level at the proxy.

A master account owner may be enabled to override access control levels applied to recognized and unrecognized user identities. The access control level to apply may be determined at the user device. A user identity of the user device may be determined to be an unrecognized user identity.

In one implementation, the unrecognized user identity is notified of the applied access control level. In another implementation, the unrecognized user identity is not notified of the applied access control level.

These general and specific aspects may be implemented using a system, a method, or a computer program, or any combination of systems, methods, and computer programs.

Other features will be apparent from the description and drawings, and from the claims.

For brevity, several elements in the figures are represented as monolithic entities. However, as would be understood by one skilled in the art, these elements each may include numerous interconnected computers and components designed to perform a set of specified operations and/or dedicated to a particular geographical region.

DETAILED DESCRIPTION

Like reference symbols in the various drawings indicate like elements.

A networking system may use access controls for the devices and user identities of the devices accessing the network. Different levels of access may be established for user identities who regularly access the network from a particular premise or are otherwise known at that premises (i.e., recognized user identities). In some instances, user identities may not he known at a particular premise (i.e., unrecognized user identities), but may nevertheless need or desire to access the network from that premise. In other instances, a user identity who regularly accesses the network from a particular premise or otherwise are known at that premise may be considered an unrecognized user identity when the identity attempts to access the network from another premise (e.g., a premise that is not associated with the user identity but that is associated with one or more other recognized user identities). In these different instances, access controls may be established for the user identity that is deemed to be an unrecognized user identity at the premise. In one implementation, the access controls applied to the unrecognized user identity are the most restrictive access control level from among the access control levels of the recognized user identities at that particular premise.

For example, when an entity accesses a network using an unidentified guest user identity or using some other identity that is unfamiliar to the local terminal or home network (e.g., next door neighbor logging into network using your borne network terminal), that entity may be deemed an unrecognized user identity. As such, the access controls established for a user identity recognized at the premises are applied to regulate access by the unrecognized user identity. Where more than one user identify is recognized at the premises (e.g., a client at the premises registers more than one identity), access controls for one of the several recognized user identities may be selected to regulate access by the unrecognized user identity. The most restrictive can be selected, which may be particularly useful when the access controls represent parental controls that are used to regulate access by recognized user identities at a premise. As such, access by unrecognized user identities coma be limited by the levels established for a youngest child in a home, preventing circumvention of desired parental controls through the use of unrecognized user identities. This document describes establishing the access controls for unrecognized user identities.

Figure 1:
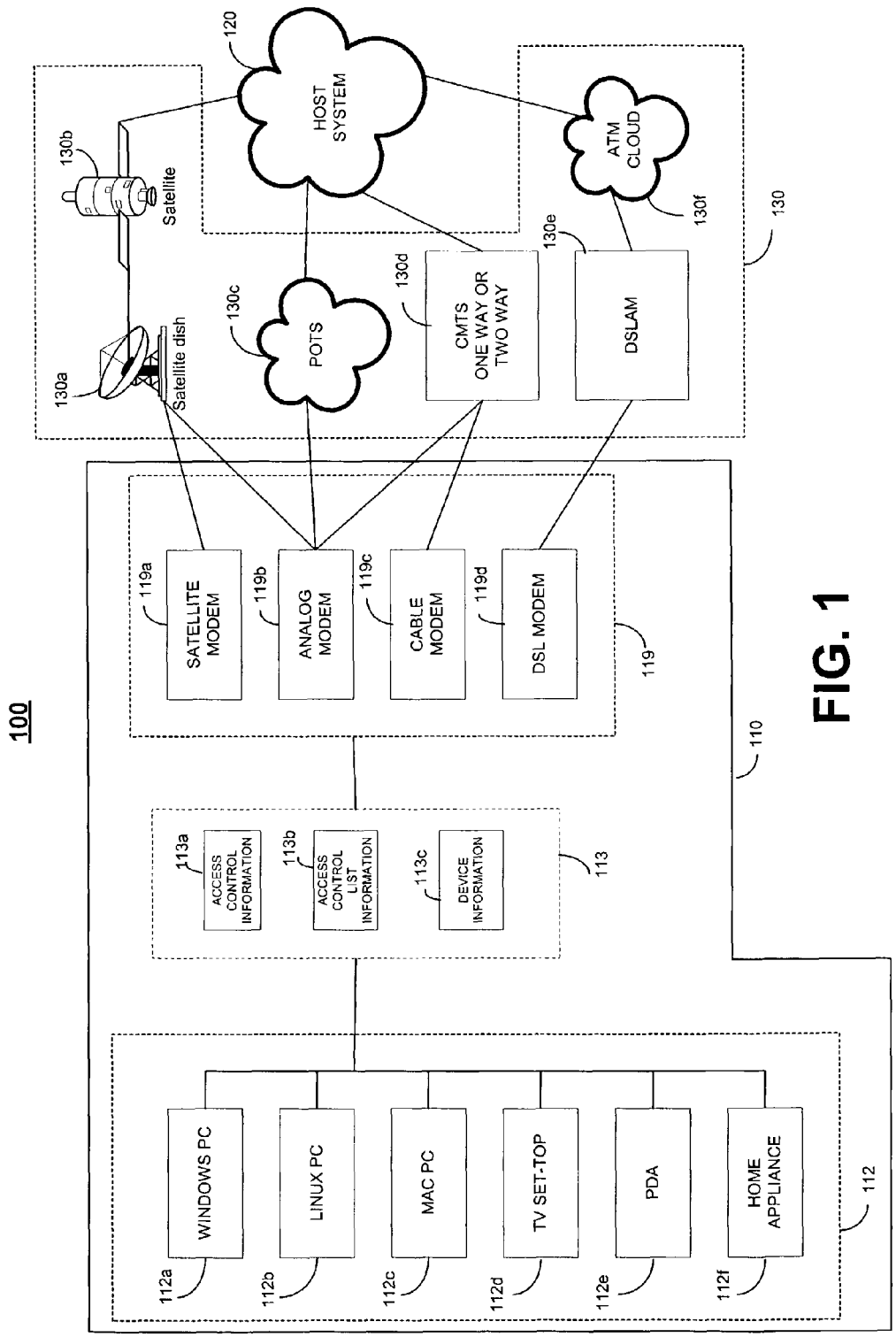
FIG. 1 is a block diagram illustrating a communications system capable of establishing access controls for a device used in a premise-based environment.

Referring to FIG. 1, a networking system 100 includes a client system 110, multiple networked devices 112 ("devices"), an optional local proxy 113, communication devices 119, a host system 120, and communication links 130. In one exemplary implementation, the devices 112 are connected to a host system 120 through a communication device 119 over communication links 130. In another exemplary implementation, the devices 112 may be connected to the optional local proxy 113. In this example, the local proxy 113 typically connects the devices 112 to the host system 120 through the communication device 119 over communication links 130.

The networking system 100 also enables the devices 112 to access information maintained by the host system 120 for a particular client device 112 or a particular user identity using one of the devices 112. In addition, the networking system 100 may maintain and enforce individual preferences or restrictions associated with a particular client device 112 or a user identity of the particular device 112 or may enable the host 120 to maintain and enforce such preferences or restrictions. This may be accomplished through use of unique identifiers, which may be assigned by the host, the client, or another entity. Unique identifiers may be used alone or in combination with other identifiers. Unique identifiers may include a login name, an account number, a screen name, a password, or a combination of these.

Recognition of the particular devices 112 or the user identities using the devices 112 permits the host system 120 to enforce or enable preferences and features, such as access controls (e.g., parental controls) or features available to a specific communication platform or environment. Similarly, the host system's recognition of or distinction among devices 112 and user identities permits the individual client devices 112 and user identities to access and receive back from the host system 120 certain host-maintained preferences, such as personal identification settings, personal web pages, account information, wallet information, and/or financial information.

When client and host systems communicate, the client system 110 may provide identifying information that is used, e.g., by the host system 120, to determine whether to enable or restrict access to information or features. However, in some contexts, the identifying information provided by the client system 110 may not enable the host system 120 to identify a particular client device that is communicating with the host system 120 or the particular user identity using the communicating client system 110. For example, the networking system 100 may include a home network system. This is particularly true in a home-networking environment in which several devices 112 within the home network system 100 may communicate through a single access point (e.g., a network access translator (NAT) or other routing device) that purposefully disguises the device identities and in which more than one person may communicate using any one of the several devices.

The optional local proxy 113 that is located between the client devices 112 and the host system 120 may be used to identify, or provide information about, a client device or a user identity of a client device that accesses the host system 120. The local proxy 113 may append information to communications sent by the client device. For instance, the local proxy 113 may append information that identifies or relates to the access control level (e.g., parental control classification) of the user identity of the client device, the type of the client device, the platform of the client device, the protocol of a system being accessed by the client device, the operating environment of the client device, and identifying information for the local proxy 113. The host system 120 may provide, or restrict, access to information or features based on the information appended to communications sent by the client device.

The local proxy 113 is positioned between the client device 112 and a host system 120 external to the client system 110, and generally is local to the client or client network and physically located in the same premises as the client device (e.g., the same personal residence).

The local proxy 113 may store an additional mirrored copy of access control information associated with one or more user identities or client devices 112. The local proxy 113 may be used to restrict communications based on the access control classification of a user identity or a device and/or may be used to verify that access control information has not been improperly modified or accessed. In one exemplary implementation, the local proxy 113 is included within a device 112.

In one implementation, for example, the local proxy 113 is physically located in a personal residence (e.g., a single-family dwelling, a house, a townhouse, an apartment, or a condominium). The devices 112 may be physically located such that communications with the local proxy 113 are enabled and maintained. For instance, when the local proxy 113 is physically located in a personal residence, the devices 112 also may be physically located in the personal residence. The location of the local proxy 113 in the personal residence does not necessarily preclude one or more of the devices 112 from being networked to the local proxy 113 from a remote location. Similarly, the location of the local proxy 113 does not necessarily preclude use of one or more of the devices 112 from outside of the personal residence or communication by those devices with the host system 120 through the local proxy 113. For instance, the devices 112 may include one or more portable computing devices that may be taken outside of the personal residence and still remain connected to the local proxy 113 located within the personal residence through a wireless network.

The devices 112 may include one or more general-purpose computers (e.g., personal computers), one or more special-purpose computers (e.g., devices specifically programmed to communicate with the local proxy 113 and/or the host system 120), or a combination of one or more general-purpose computers and one or more special-purpose computers. Other examples of devices 112 include a workstation, a server, an appliance (e.g., a refrigerator, a microwave, and an oven), an intelligent household device (e.g., a thermostat, a security system, a heating, ventilation and air conditioning (HVAC) system, and a stereo system), a device, a component, other physical or virtual equipment, or some combination of these elements capable of responding to and executing instructions within the system architecture. In one implementation, the devices 112 may store an additional mirrored copy of access control information associated with one or more user identities or client devices 112.

FIG. 1 shows several implementations and possible combinations of devices and systems used within the networking system 100. Examples of devices 112 may include, but are not limited to, a personal computer with a Windows™ operating system (OS) 112a, a personal computer with a Linux™-based OS 112b, a Macintosh™ personal computer 112c, a TV set-top box 112d, a personal digital assistant (PDA) 112e, and a home appliance 112f. In one exemplary implementation, the devices 112 may be connected through a network to the local proxy 113.

Some of the devices 112, such as the personal computer with Windows™ OS 112a, the personal computer with a Linux™-based OS 112b, the Macintosh™ personal computer 112c, and the PDA 112e, include software for logging on to the host system 120 using a particular identity associated with the user of the device. Such devices may be referred to as client devices. Other devices, such as the home appliance 112f, may include software for logging on to host system 120 without identifying an associated identity of the user of the device and may be referred to as non-client devices. Yet other devices, such as the TV set-top 112d, may be able to function either as a client device or a non-client device depending on the function being performed.

The local proxy 113 may be a protocol server module, a home gateway device, a router, or another communications device, and also may be a home entertainment device, such as a stereo system, a radio tuner, a TV tuner, a portable music player, a personal video recorder, or a gaming device. The local proxy 113 may be referred to as a client-side proxy. The local proxy 113 is separated from the host system 120 by communications links 130. In some implementations, devices 112 typically send requests for content to a destination system (not shown), which may include the host system 120 or a network external to the host system 120. When the request for content is made to a destination system other than the host system 120, an online access provider device, which may optionally be included as part of the host system 120, may be used to access the ultimate destination system. A destination system other than host system 120 may include, for example, a resource accessible through a network such as the Internet and/or the World Wide Web.

The online access provider device may facilitate communications between the devices 112 and the destination system while leveraging access control information maintained and stored on the host system 120. In some implementations, host system 120 may include the online access provider device, such as an Internet access provider. In other implementations, the online access provider device may be separate from the host system 120. Although not shown by FIG. 1, the online access provider device may be separated from the local proxy 113 by communications links 130. The local proxy 113 typically connects to the host system 120 using a communication device 119.

The networking system 100 enables the devices 112 to communicate with the host system 120 through the local proxy 113 using a single communication device 119. The devices 112, the local proxy 113, and the communication device 119 may be a client system 110 physically located in a personal residence. Examples of the communication device 119 may include (and are not limited to) a satellite modem 119a, an analog modem 119b, a cable modem 119c, and a DSL modem 119d.

The local proxy 113 uses the communication device 119 to communicate through communication links 130 with the host system 120. The communication links 130 may include various types of communication delivery systems that correspond to the type of communication device 119 being used. For example, if the local proxy 113 includes a satellite modem 119a, then the communications from the devices 112 and the local proxy 113 may be delivered to the host system 120 using a satellite dish 130a and a satellite 130b. The analog modem 119b may use one of several communications links 119, such as the satellite dish 130a and satellite 130b, the Plain Old Telephone Service (POTS) 130c, and the Cable Modem Termination System (CMTS) 130d. The cable modem 119c typically uses the CMTS 130d to deliver and receive communications from the host system 120. The DSL modem 119d typically delivers and receives communications with the host system 120 through a Digital Subscriber Line Access Multiplexer (DSLAM) 130e and an Asynchronous Transfer Mode (ATM) network 130f.

The networking system 100 may use various protocols to communicate between the devices 112 and the local proxy 113 and between the local proxy 113 and the host system 120. For example, a first protocol may be used to communicate between the devices 112 and the local proxy 113, and a second protocol may be used to communicate between the local proxy 113 and the host system 120. In one implementation, the first protocol and the second protocol are the same. In another implementation, the first protocol and the second protocol are different. The local proxy 113 may include different hardware and/or software modules to implement different networking system protocols.

The local proxy 113 may append access control information to communications prior to sending the communications to the host system 120. For example, the local proxy 113 may retrieve access control information 113a that is associated with the identity using the device 112 that is sending the communication, insert the retrieved access control information in the communication, and send the communication including the access control information to the host system 120.

Additionally or alternatively, the local proxy 113 may function to filter communications before the communications are sent the host system 120. For instance, the local proxy 113 may apply access controls to communications sent using one of the devices 112 based on the identity of the device user and/or the device that is sending the communication. This may be accomplished by retrieving access control information 113*a* that is associated with the identity of the device user and/or the device that is sending the communication. Access control information 113*a* may include a predefined level of access control that is assigned to the user identity and/or the device. For example, in one exemplary implementation, access control information 113*a* includes different levels of parental control, such as, for example, adult, mature teen, teen, young adult, child, and toddler, that may be assigned to a user identity and/or a device. Access control list information (e.g., local 113*b* or remote 120) is used to identify destinations that may not be accessed based on the access control information 113*a* (e.g., a particular parental control level) associated with the user identity and/or the device sending the communication. The communication is sent to the host system 120 only when the access control list information permits the destination to be accessed by the user identity and/or device sending the communication.

The local proxy 113 may append device information to communications prior to sending the communications to the host system 120. For example, the local proxy 113 may access device information 113*c* that is associated with the device that is sending the communication, insert the accessed device information in the communication, and send the communication including the accessed device information to the host system 120.

Device information 113*c* may be stored in a configuration table or list on the local proxy 113, and may be associated with a device identifier for a device, such as devices 112*a*-112*f*. The device identifier may include a hardware device identifier, such as a MAC ("Media Access Control") address, and/or a network address, such as a static IP address associated with the device or a dynamic IP address. The dynamic IP address may be assigned by local proxy 113 or by some other network device or the host system 120 through the Dynamic Host Configuration Protocol or another protocol that enables the dynamic allocation of an IP address to a device on a network. The device information 113*c* associated with each device may include, for example, the type of device (e.g., a client or a non-client device), the class of device (e.g., a gaming device, a personal computer, or a PDA), the type of platform (e.g., the type of hardware, such as a Macintosh™ personal computer, a Windows™-based personal computer, a Linux™-based personal computer, a PDA, a home appliance, or an entertainment device), and/or the operating environment (e.g., operating system type and/or version). Device information 113*c* also may include identifying information associated with the local proxy 113 (e.g., an identification number).

The local proxy 113 may be configured in a hub-and-spoke configuration in which the functions performed by the local proxy 113 are distributed to other devices (e.g., a parental control device) that are directed by the local proxy 113. Alternatively, for example, the local proxy 113 may be configured to include both the access control functions and the gateway functions. The local proxy 113 also may be implemented in other network configurations.

A recognized user identity includes any user identity designated by a master identity (e.g., the owner of a master account or the owner's designee) and that is associated with a premise. The master identity itself includes a recognized user identity and may assign access control levels to the registered user identities. User identities assigned to a master account also may be recognized user identities. The recognized user identity may be associated with a premise by being associated with a local terminal and/or a home network.

An unrecognized user identity includes a user identity not designated by a master identity and not associated with a master account and that is not associated with a premise, such as being associated with a local terminal and/or a home network. A user identity may still be considered an unrecognized user identity if that user identity uses a device that is associated with a master identity or a master account with which the user identity is not associated.

In one implementation, the local proxy 113 may be configured to determine an access control level to apply to communications between an unrecognized user identity (e.g., a guest user of a device) and/or an unrecognized device and a destination system, such as, for example, the host system 120 or a network external to the host system 120. The local proxy 113 may select the most restrictive access control level from among the different access control levels that are applied to communications between recognized user identities of the devices 112 and/or recognized devices 112 and the host system 120. This may be accomplished by using the access control information 113*a* that is associated with recognized users of the networking system 100 to identify unrecognized user identities of devices 112. Then, for unrecognized user identities, the local proxy 113 may select and apply the most restrictive access control level from among access controls levels applied to recognized user identities. For example, if teen is the most restrictive access control level applied to users and devices recognized by local proxy 113, the local proxy selects the teen access control level.

Figure 2:
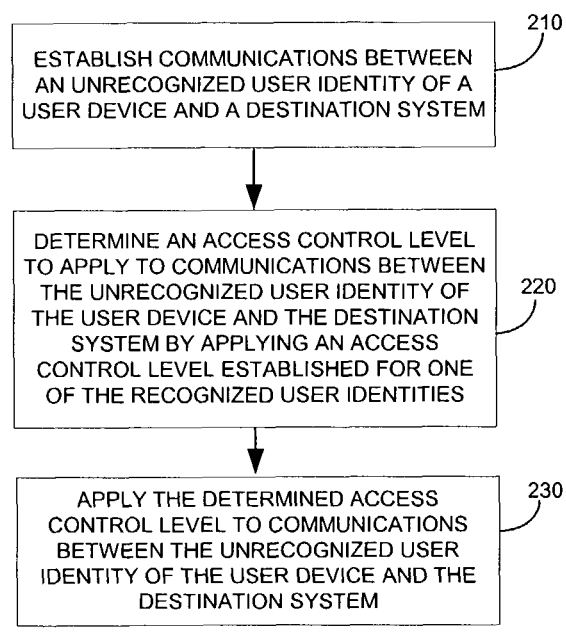
FIG. 2 is a flow chart of an exemplary process for establishing access controls for a guest user.

FIG. 2 illustrates an exemplary process 200 for establishing access controls. Process 200 includes establishing a communication session between an unrecognized user identity of a user device and a destination system through an online access provider device that provides the user device with access to the destination system (step 210). The communication session may be established from a premise having associated therewith one or more user identities that are recognized by the online access provider device, with at least two of the recognized user identities being associated with different access control levels.

An access control level is determined to apply to communications between the unrecognized user identity of the user device and the destination system by applying an access control level established for one of the recognized user identities (step 220). The determined access control level then is applied to communications between the unrecognized user identity of the user device and the destination system (step 230).

In one exemplary implementation, process 200 may be used to establish access controls for an unrecognized user identity (e.g., a guest user) of a user device that is an element of the premise that is being used to access the destination system. The access control level that is applied to the unrecognized user identity (e.g., guest user) is the most restrictive access control level that is applied from among the recognized user identities of the premise (step 230). The most restrictive access control level may be determined by looking at the access control level applied to each of the recognized user identities from the premise and selecting the most restrictive access control level from among the levels applied to the recognized user identities (step 220). Applying the most restrictive access control level to the unrecognized user identity ensures that the unrecognized user identities, who may or may not have an associated access control level, can only access content from the network that is consistent with the most restrictive access control level applied to a recognized user identity of that network.

The premise may include a network system, such as the network system 100, and the user device may include a device, such as one of the devices 112 as described above with respect to FIG. 1. An element of the premise may include any device communicating through a physical network interface associated with a recognized user identity. For example, an element of the premise includes mobile and portable devices, such as laptop computers and PDAs, if these devices are using a home network or if these devices themselves had a network interface associated with a recognized user identity.

In one implementation, if the unrecognized user identity has a more restrictive access control level than that associated with recognized user identities, then the unrecognized user identity's more restrictive access control level may be applied.

Figure 3:
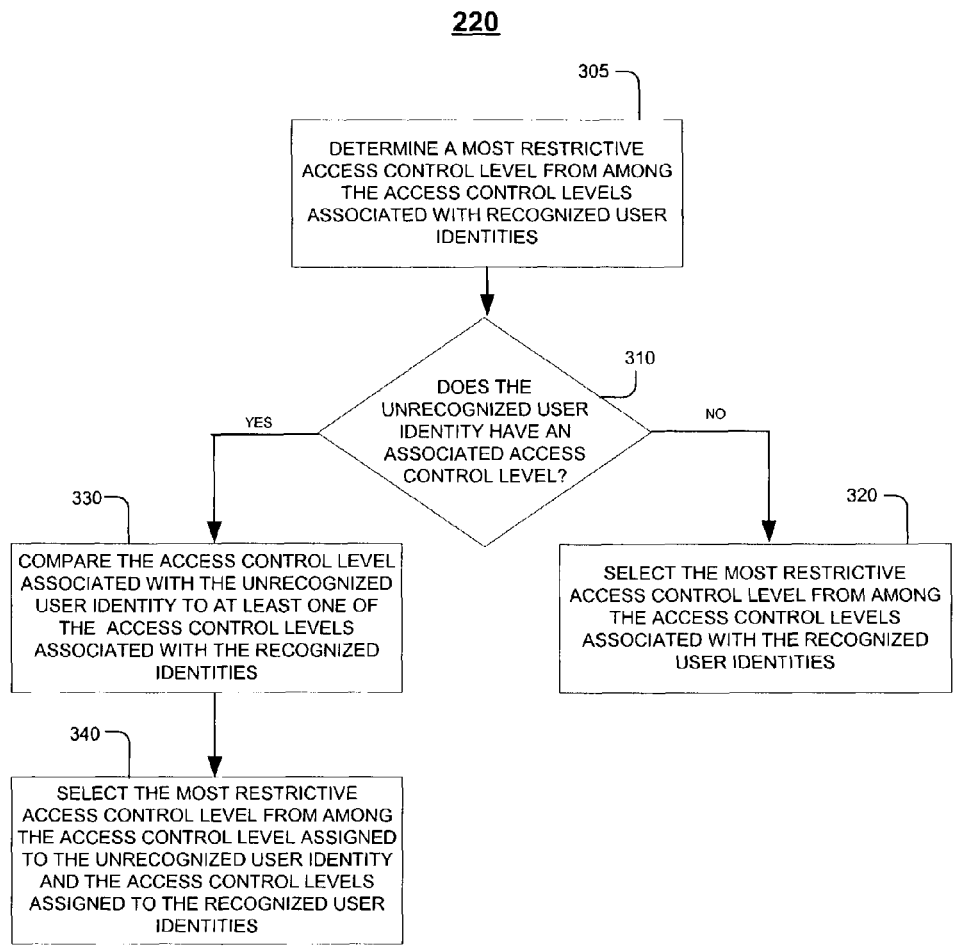
FIG. 3 is a flow chart of an exemplary process for determining an access control level to apply to an unrecognized user identity.

FIG. 3 illustrates an exemplary process 220 for determining the access control level to apply to the unrecognized user identity. Process 220 determines a most restrictive access control level from among the access control levels associated with recognized user identities (step 305). Process 220 then determines whether the unrecognized user identity has an associated access control level (step 310). If the unrecognized user identity does not have an associated access control level, then the most restrictive access control level from among the access control levels associated with the recognized user identities is selected (step 320). If the unrecognized user identity has an associated access control level, then the access control level associated with the unrecognized user identity is compared to the access control levels assigned to the recognized user identities (step 330). The most restrictive access control level from among the access control level assigned to the unrecognized user identity and the access control levels assigned to the recognized user identities is selected based on the comparison (step 340).

The access control level that is applied to communications between an unrecognized user identity of a user device in the network may change automatically as the access control levels for the recognized user identities are changed. One exemplary implementation is where the access control levels include parental control levels. For example, if the most restrictive parental control level from among the recognized users is changed from "young teen" to "mature teen," then the parental control level applied to communications involving an unrecognized user identity from the premise will be "mature teen." Typically, at least one user in the premise will be designated as an administrator/master (e.g., a parent or a guardian) who can control the parental control levels set for the recognized user identities of the premise. When the administrator changes the parental control levels such that there is a change to the most restrictive parental control level, then that new most restrictive level is applied to communications between an unrecognized user identity and a destination system.

In another exemplary implementation, the administrator/master may determine the logic for selecting the appropriate access control level to apply for an unrecognized user identity. For example, the administrator/master may determine that the appropriate access control level to apply for an unrecognized user identity is the least restrictive access control level from among the access control levels associated with the recognized user identities. In another implementation, the administrator may determine that the appropriate access control level to set is the most restrictive access control level from among the access control levels associated with the recognized user identities that is no higher and/or lower than a designated access control level. In yet another implementation, the administrator/master may determine that the appropriate access control level to set is a combination of access control levels from among the recognized user identities. For example, one access control level may be applied to communications for internal network communications and a second access control level may be applied to external network communications. The unrecognized user identity may or may not be notified that access control levels are being applied to communications with a destination system.

Figure 4:
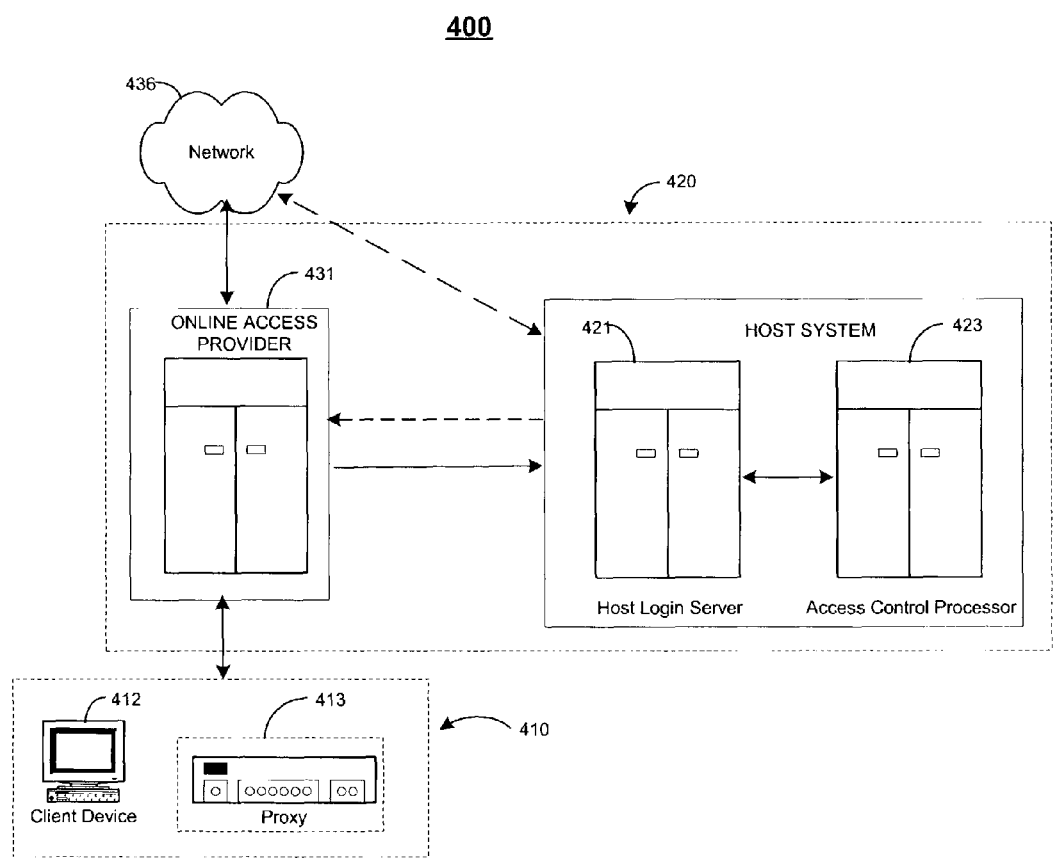
FIGS. 4 and 6 are block diagrams illustrating communications systems capable of establishing access controls for a device used in a premise-based environment.

Referring again to FIG. 2, process 200 may be used with different system setups and components. The following are exemplary implementations of different systems which may implement process 200. FIG. 4 illustrates one exemplary implementation that includes a communications system capable of establishing access controls for a device used in a premise (e.g., a home network) using a host system that applies access controls. A networking system 400 includes a client system 410 that has a client device 412 and an optional local proxy 413, a host system 420 that has a host login server 421 and an access control processor 423, and a network 436. Networking system 400 also includes an online access provider device 431, which may be included as part of the host system 420 or may be an element that is separate from the host system 420.

Referring also to FIG. 1, client system 410 having client device 412 and an optional local proxy 413 may be similar to client system 110 having client devices 112 and local proxy 113. In one implementation, client device 412 may establish communications with a destination system through an online access provider device 431 and request content from the destination system. In this exemplary implementation, the destination system may include the host system 420 and/or the network 436. For example, host system 420 may include a proprietary content provider and network 436 may include other networks external to the host system 420 such as the Internet and the World Wide Web. In another implementation, the client device 412 may establish communications with a destination system using the local proxy 413.

The online access provider device 431 provides client system 410 with access to host system 420 and/or network 436. In one implementation, the online access provider 431 may be a part of the host system 420 similar to the example of host system 120 of FIG. 1. In this implementation, the online access provider device 431 may be included as the host login server 421 and may provide the same functionality as the host login server 421.

In another exemplary implementation, the online access provider device 431 is separate from the host system 420. In this implementation, the online access provider device 431 functions as an intermediary between the client device 412 and the network 436 while leveraging access controls (e.g., parental control levels) maintained and provided by the host system 420. The online access provider may retrieve content requested by client device 412 from the network 436.

Figure 5:
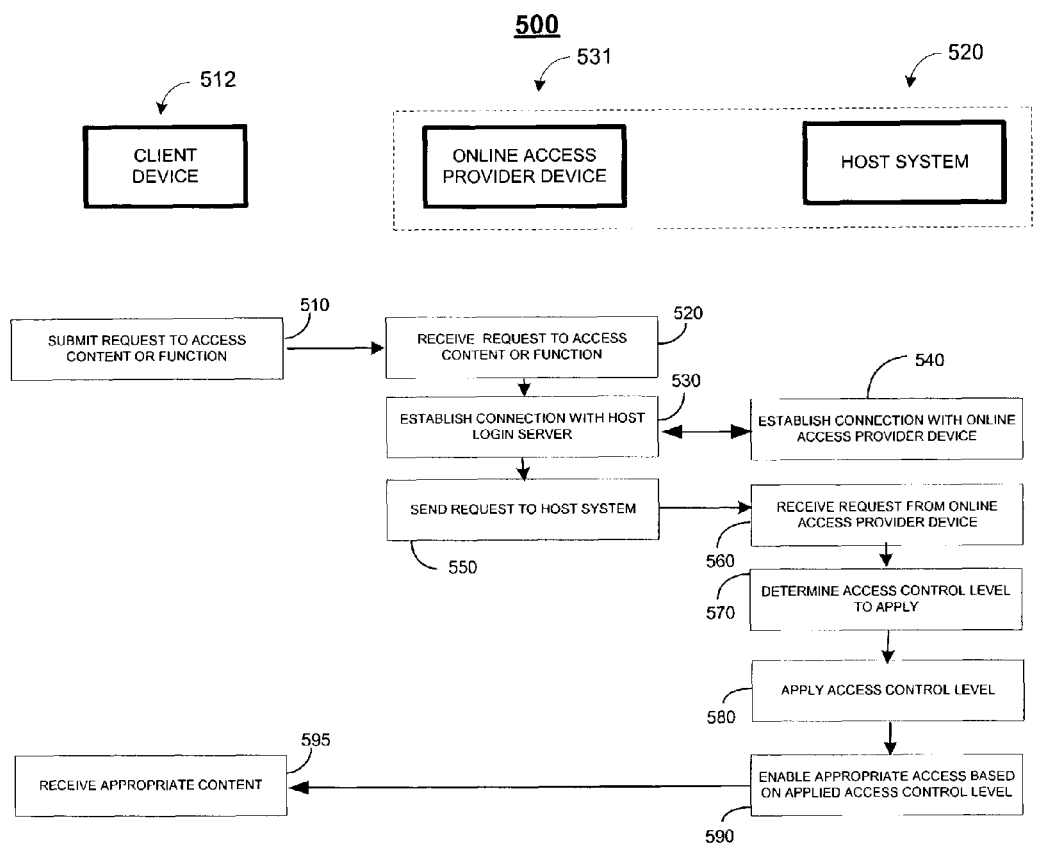
FIGS. 5 and 7 are flow diagrams illustrating communications between a device, a local proxy server, and a host system to establish access controls for a device used in a premise-based environment.

FIG. 5 illustrates a block diagram of a process 500 for establishing access controls between an unrecognized user identity of a client device 512 and a host system 520 through an online access provider device 531, where the host system 520 determines and applies the access control level for the unrecognized user identity. Examples of each element within the block diagram of FIG. 5 are broadly described above with respect to FIGS. 1 and 4. In particular, the user device 512 typically has attributes comparable to those described with respect to devices 112 and 412 of FIGS. 1 and 4. The online access provider device 531 typically has attributes comparable to those described above with respect to online access provider device 431 of FIG. 4. The host system 520 typically has attributes comparable to those described with respect to host systems 120 and 420 of FIGS. 1 and 4. In this example, the online access provider device 531 may be included as part of the host system 520 or may be an entity that is separate from the host system 520. In this example, the destination system for the requests from the client device 512 may include, for instance, the host system 520 and/or the network, such as network 436 of FIG. 4.

Process 500 may be used to enable access controls for a communication session between a client device 512 and a destination system (e.g., host system 520 or network 436), where the communication session is established from a premise having one or more users recognized by the online access provider device 531 and/or the host system 520. In this instance, the user is not a recognized user from the premise, such as, for example a guest user of the client device 512. The guest user may be recognized by the online access provider device 531 and/or the host system 520 but the user is not associated with the premise from which the request is being made.

In this example, access control information is maintained and stored at the host system 520. In process 500, an unrecognized user identity uses client device 512 to submit a request for content or function from the host system 520 (step 510). The online access provider device 531 receives the request to access content or function from the client device 512 (step 520) and establishes a connection with the host login server (steps 530 and 540). After establishing a connection with the host system 520, the online access provider device 531 sends the request to the host system (step 550).

In one implementation, the online access provider device 531 is included as an element of the host system 520. In this instance, steps 520-540 may be combined such that when the client device 512 establishes a connection with the online access provider device 531, then a connection is in effect established with the host login server because the online access provider device 531 and the host system 520 may be the same entity.

In another implementation, the online access provider device 531 is a separate entity from the host system 520. In this instance, the client device 512 may initially establish a connection through the online access provider device 531 (steps 510 and 520) so that a communication session may be established between the client device 512 and the host system 520. Once the communication session between the client device 512 and the host system 520 is established, the online access provider device 531 may not be necessary. In other instances, once the communication session between the client device 512 and the host system 520 has been established, the online access provider device 531 may still remain as part of the connection through which the communications pass.

The host system 520 receives the request from the online access provider device 531 (step 560) and determines the access control level to apply to the request (step 570). In this example, the host system 520 determines the access control level to apply using the most restrictive access control level from access control levels that are applied to communications involving recognized user identities from the premise (step 570). For example, the host system 520 may use an access control list that identifies the client device 512 as being associated with one or more recognized user identities, where the recognized user identities each have an associated access control level. Since the unrecognized user identity is not associated with the client device 512, the host system 520 determines the access control level to apply to the unrecognized user identity by using the most restrictive access control level that is associated with one or more of the recognized user identities.

The host system 512 applies the access control level to the request (step 580) and enables appropriate access to the requested content based on the applied access control level (step 590). The client device 512 then receives the appropriate content (step 595).

The request from the client device 512 may include authenticating information. For example, the authenticating information may include a screen name and a password or other authenticating information. If the host system 520 determines that the identity associated with the client device 512 is not an authenticated user, the host system 520 may take any of several actions, including terminating the session immediately, sending a message to the client device 512, or sending a message to a master or supervisory account associated with the premise.

The request from the client device 512 also may include information that identifies the client device with a premise and/or a master account. For example, the device information may include a device identifier and device information associated with the device identifier, such as the type and/or class of device, the type of platform, or the operating system type and/or version. The host system 520 may use the device information to associate the device with a particular premise or a master account. In this exemplary implementation, each device from the same premise may be associated with that premise or a master account associated with that premise. This may be accomplished by using a table indexed by device identifier (or otherwise) to look-up the account associated with the client device 512. Additionally or alternatively, the client devices 512 from the same premise all may be associated with the same unique identifier, such as, for example, a master account.

In another implementation, client device 512 may communicate with the host system 520 through a local proxy, such as, for example, local proxy 413 of FIG. 4. In this exemplary implementation, the local proxy may append information to the request from the client device 512 that identifies the request as being from a particular premise and/or master account. For example, the local proxy may include an identifier that identifies the local proxy to the host system 520 such that requests originating from the local proxy are identified by the host system 520 with a particular master account. This may be accomplished by using the table indexed by local proxy identifiers (or otherwise) to look-up an account associated with the local proxy.

Once the host system 520 associates the client device 512 with a premise and/or a master account, the host system may retrieve access control information for all accounts associated with that premise and/or master account to determine the correct level of access controls to apply to communications between the client device 512 and the host system 520. This may be accomplished, for example, by using a table indexed by screen name (or otherwise) to look-up the most restrictive access control level from among the screen names that are associated with the premise and/or the master account. One exemplary implementation is illustrated in the table below where the access control levels include parental control levels. The table may identify a master account or premise, a password, and a parental control associated with a screen name.

| Master Account | Screen Name | Password | Parental Control Level |
|---|---|---|---|
| SmithFamily | Robert_Smith | 5846%JYNG | Adult |
| SmithFamily | Suzie_Smith | 6748#474V | YoungTeen |
| SmithFamily | Bill_Smith | JHG7868$0 | MatureTeen |
| JonesFamily | Greg_Jones | 85775$#59 | Adult |

For example, a guest user may use client device 512 to request content from the host system 520, where the client device 512 is associated with the SmithFamily master account and the guest user is associated with the JonesFamily master account and has the screen name Greg_Jones and associated password with an Adult parental control level. When Greg_Jones uses the client device 512 associated with the SmithFamily master account, the host system 520 first determines that the client device 512 is associated with the SmithFamily master account using a device identifier. Then, if the screen name being used to access the host system 520 is also associated with the SmithFamily master account, the host system 520 applies the parental control level associated with that screen name. But, in this example, the screen name of the guest user is not associated with the SmithFamily master account. So, in this case, the host system 520 determines the appropriate parental control level to apply by selecting the most restrictive parental control level applied from among the screen names associated with the SmithFamily. In this case, the host system 520 determines that "YoungTeen" is the appropriate level to apply to the guest user even though the guest user's typical parental control level is "Adult," which is less restrictive than the YoungTeen parental control level.

In the situation where the guest user is able to access the host system 520 using the client device 512, but does not have an associated parental control level, the host system 520 determines the parental control level to apply by selecting the most restrictive parental control level from among the parental control levels associated with the screen names from the master account.

In the situation where the guest user's parental control level is more restrictive than the most restrictive parental control level from among the parental control levels associated with the screen names from the master account, the host system 520 may apply the guest user's more restrictive parental control level.

In one implementation, an administrator of the master account may override the most restrictive access control level that is applied to communications from the guest user using client device 512. For example, if the guest user typically has an Adult parental control level and the host system 520 applies a more restrictive parental control level, then the administrator of the master account may override the more restrictive level that is being applied such that the Adult parental control level is applied.

As the parental control levels associated with a screen name are changed, for example, from YoungTeen to MatureTeen, then the most restrictive parental control level that will be applied for guest users will automatically change to match the updated parental control levels.

Once the host system 520 determines the appropriate access control level to apply (step 570), the host system 520 may apply the appropriate access control level to the requested content from the client device 512 (step 580). For example, the host system 520 may access an access control list that identifies the addresses to which a particular access control level is permitted or denied access, as depicted in the table below.

| Address | Adult Allowed | Mature Teen Allowed | Mature Teen Not Allowed | Young Teen Allowed | Young Teen Not Allowed | Child Allowed | Child Not Allowed |
|---|---|---|---|---|---|---|---|
| 123.45.67.* | X | X | | | X | | X |
| 123.45.68.* | X | | X | | X | | X |

An address that occurs within the range of addresses (here, the range 123.45.67.000 to 123.45.67.999 is indicated by 123.45.67.*) may be accessed by the adult and mature teen access control levels and may not be accessed by the young teen and child access control levels. An address that occurs within the range of addresses as indicated by 123.45.68.* (here, 123.45.68.000 to 123.45.68.999) may be accessed only by the adult access control level and may not be accessed by a mature teen, young teen or child access control level.

Some implementations may use different data management techniques. For example, the access control level of adult may not be controlled, and that level may not appear on any access control list for that reason. For example, a particular access control list may include the addresses that are associated with a particular access control level (e.g., an access control list for a mature teen, another access control list for a young teen, and yet another access control list for a child). Some implementations may include the addresses that a particular access control level may not access, which may be referred to as a block list or black list for a particular access control level. Similarly, a particular access control list may include the addresses that a particular access control level may access, which may be referred to as a white list for a particular access control level. For example, an access control list may contain the list of addresses that may be accessed by a mature teen, and another access control list may contain the list of addresses that may not be accessed by a young teen.

Alternatively, some implementations may only apply access controls to communications from client devices when the access control level associated with the screen name of the identity using the client device corresponds to a particular level or a set of particular levels. For example, when a host system uses access control levels of adult, mature teen, young teen, and child, the host system may only apply access controls to communications from client devices when the access control level associated with the screen name of the identity using the client device is a mature teen, young teen or child, and may not apply access controls to communications when the access control level is an adult.

The host system 520 retrieves the content as permitted by the access control application (step 590). That is, when the application of access controls in step 580 allows the identity to access the address requested, the host system 520 retrieves the content associated with the address requested (e.g., the World Wide Web page associated with a particular Internet address). When the application of access controls in step 580 does not allow the identity of the client device 512 to access the requested address, step 590 may not be performed.

Some implementations may use one or more heuristic or algorithmic procedures to analyze the content associated with the received address after retrieval to determine whether the content is appropriate for one or more particular access control levels. For example, a list of keywords may be associated with prohibited content for a particular access control level or a set of particular access control levels. When the content is not appropriate for the access control level of the identity associated with the client device 512, the content is not sent to the client device 512 or the optional local proxy 413.

The host system 520 sends the content as permitted by the application of access controls to the client device 410 (step 590). When the user identity associated with the client device 512 is permitted to access the requested address and/or the content or a function associated with the requested address, the content is sent to and received by the client device 512 (step 595). Alternatively, the content may be sent to the local proxy 413, and the local proxy 413 receives and forwards the content to client device 512. The client device 512 receives the content (step 595).

When the identity associated with the client device 512 is not permitted to access the requested address and/or the content or a function associated with the requested address, the host system 520 may send a message indicating that access is not permitted to the client device 512 and/or the local proxy 413. If a local proxy is being used, the local proxy 413 receives and forwards the message indicating that access is not permitted to the client device 512, and the client device 512 receives the message.

In one exemplary implementation, the destination system may include a network other than the host system 520, such as network 436 of FIG. 4. In this implementation, the online access provider device 531 leverages the access control levels from other systems, such as access control levels provided by host system 520, for communications received from client device 512. The online access provider device 531 routes communications to which access controls need to be applied to host system 520 for the application of access controls.

The online access provider device 531 may retrieve content from network 436 as permitted by the application of access controls, and may provide the content to the client device 512. In some implementations, the host system 520 may retrieve the content from the network 436 as permitted by the application of access controls, and may provide the content to the online access provider 531 for forwarding the content on to client device 512.

Figure 6:
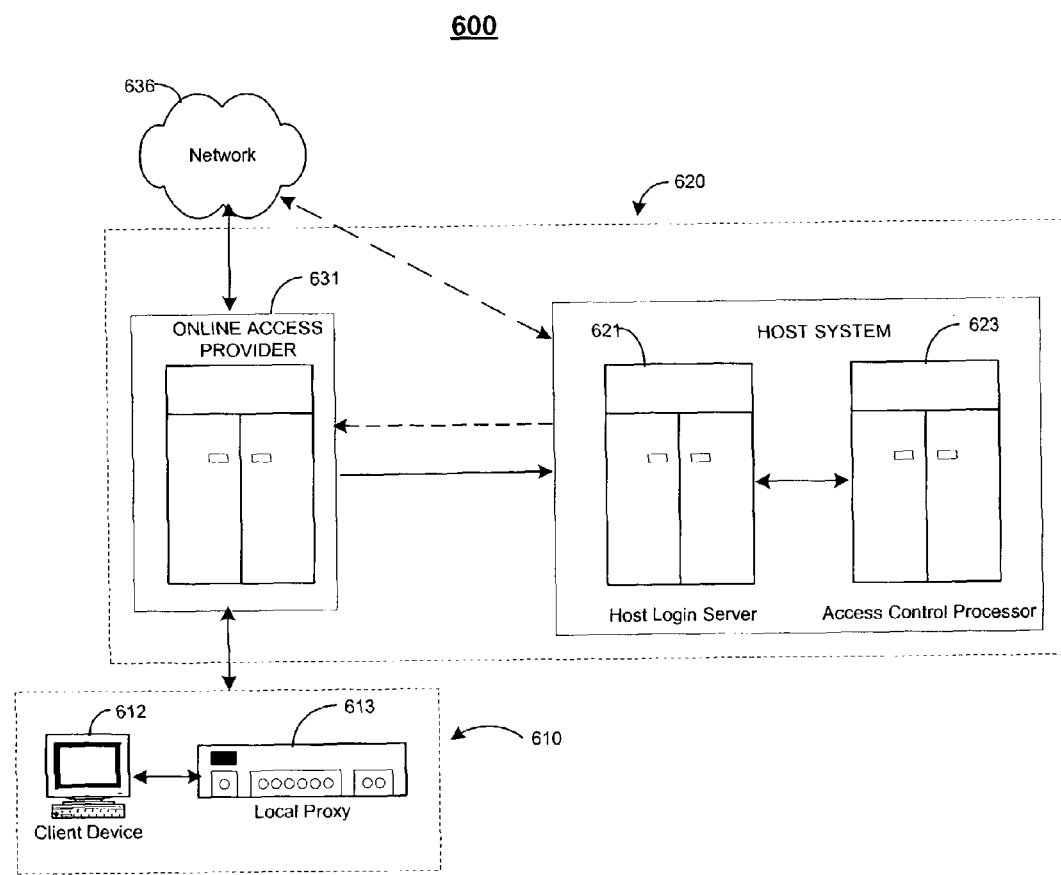

In one exemplary implementation, FIG. 6 illustrates a communications system capable of establishing access controls for a device used in a premise (e.g., a home network) using a local proxy device that applies access controls. A networking system 600 includes a client system 610 that has a client device 612 and a local proxy device 613, a host system 620 that has a host login server 621 and an access control processor 623, and a network 636. Networking system 600 also includes an online access provider device 631, which may be included as part of the host system 620 or may be an element that is separate from the host system 620.

Examples of each element within the block diagram of FIG. 6 are broadly described above with respect to FIGS. 1, 4, and 5. In particular, the client device 612 typically has attributes comparable to those described with respect to devices 112, 412, and 512 of FIGS. 1, 4, and 5. The online access provider device 631 typically has attributes comparable to those described above with respect to online access provider devices 431 and 531 of FIGS. 4 and 5. The host system 620 typically has attributes comparable to those described with respect to host systems 120, 420, and 520 of FIGS. 1, 4, and 5. The local proxy device 613 typically has attributes comparable to those described with respect to local proxy devices 113 and 413 of FIGS. 1 and 4.

In this exemplary implementation, the destination system may include the host system 620 and/or the network 636. For example, host system 620 may include a proprietary content provider and network 636 may include the Internet.

The online access provider device 631 provides client system 610 and the local proxy device 613 with access to host system 620 and/or network 636. In one implementation, the online access provider 631 may be a part of the host system 620. In this implementation, the online access provider device 631 may be included as the host login server 621 and may provide the same functionality as the host login server 621.

In another exemplary implementation, the online access provider device 631 is separate from the host system 620. In this implementation, the online access provider device 631 may function as an intermediary between the client device 612 and the network 636 while leveraging access controls (e.g., parental control levels) maintained and provided by the host system 620.

The local proxy device 613 stores access control information, such as, for example, access control information 113a, access control list information 113b, and device information 113c described above with respect to FIG. 1.

Some implementations may use a transient connection (such as a narrowband or dial-up connection) from local proxy 613 to online access provider device 631. In such a case, the local proxy 613 and online access provider 631 may exchange communications that include authentication messages used to establish a trusted connection.

The local proxy 613 may maintain a persistent connection to the online access provider device 631. A persistent connection may be particularly beneficial when the number of communications messages routed between the online access provider and the host system 620 and/or network 636 is greater than the capacity afforded by a transient connection that requires authentication to be performed when a connection is established. A persistent connection may improve the performance of the application of access controls by the host system 620 to communications that use access provided by the online access provider 631.

The host system 620 and the online access provider 631 may be the same or different legal entities. Generally, the host system 620 and the online access provider 631 are different legal entities.

Figure 7:
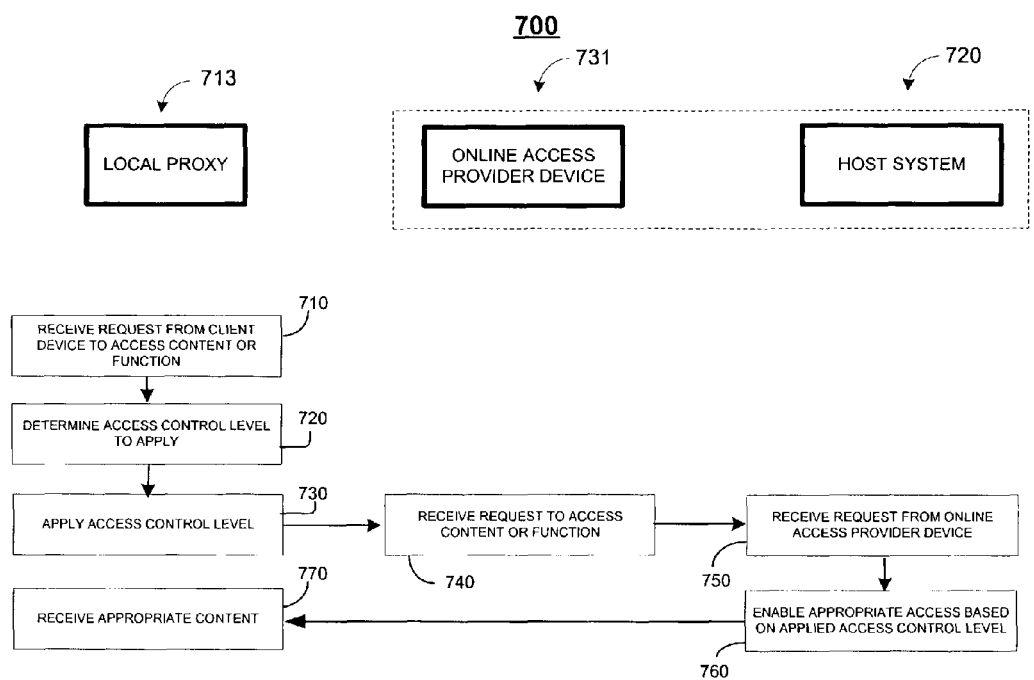

FIG. 7 illustrates a block diagram of a process 700 for establishing access controls between an unrecognized user identity of a device and a host system 720 through a local proxy 713 that determines the access control level to apply and an online access provider device 731. A client device (not shown) such as those devices 112, 412, 512, and 612 of FIGS. 1 and 4-6 communicates with a local proxy 713, such as local proxy 113, 413, and 613 in FIGS. 1, 4 and 6. The local proxy 713 communicates with the host system 720 and/or the network 736 through the online access provider device 731.

Examples of each element within the block diagram of FIG. 7 are broadly described above with respect to FIGS. 1 and 4-6. The online access provider device 731 typically has attributes comparable to those described above with respect to online access provider device 431 and 631 of FIGS. 4 and 6. The host system 720 typically has attributes comparable to those described with respect to host systems 120, 420, 520 and 620 of FIGS. 1 and 4-6. In this example, the online access provider device 731 may be included as part of the host system 720 or may be an entity that is separate from the host system 720.

Process 700 may be used to enable access controls for a communication session between a client device and a destination system (e.g., host system 720 or a network external to the host system, such as network 636 of FIG. 6), where the communication session is established from a premise having one or more user identities recognized by the online access provider device 731 and/or the host system 720. In this instance, local proxy device 713 determines the appropriate access control level to apply and applies the most restrictive access control level from among the access control levels applied to the recognized user identities.

Process 700 is similar to process 500 except that the local proxy 731 determines the access control level to apply and applies the appropriate access control level instead of having the host system determine and apply the access control level. In process 700, the local proxy 713 receives a request for access to content or function from a client device (step 710). The local proxy 713 determines the access control level to apply to the request (step 720). In this example, the local proxy 713 may store a mirrored copy of access control information that also may be maintained and stored by the host system 720. The local proxy 713 may determine the access control level to apply as discussed above with respect to process 500 of FIG. 5 where the host system determined the access control level to apply. For example, the local proxy 713 may use the most restrictive access control level from among access controls applied to communications involving recognized user identities. The local proxy 713 may use an access control list that identifies the recognized users, where each recognized user may have an associated access control level, and may select the most restrictive of those access control levels to apply an unrecognized user identity (e.g., a guest user) of the client device.

The local proxy 713 then applies the most restrictive access control level to the request (step 730). This may be accomplished by the local proxy 713 appending the access control information to the request from the client device. The request, along with the appended access control information, may be forwarded to the online access provider device 731. The online access provider device 731 receives the request to access content or function from the local proxy 713 (step 740). The online access provider device 731 then passes the request to the host system 720, which receives the request (step 760) and enables appropriate access based on the applied access control level (step 770). The host system 720 sends the requested content to the local proxy 713, which receives the appropriate content (step 780) and distributes the content to the client device that originated the request.

The described systems, methods, and techniques may be implemented in digital electronic circuitry, computer hardware, firmware, software, or in combinations of these elements. Apparatus embodying these techniques may include appropriate input and output devices, a computer processor, and a computer program product tangibly embodied in a machine-readable storage device for execution by a programmable processor. A process embodying these techniques may be performed by a programmable processor executing a program of instructions to perform desired functions by operating on input data and generating appropriate output. The techniques may be implemented in one or more computer programs that are executable on a programmable system including at least one programmable processor coupled to receive data and instructions from, and to transmit data and instructions to, a data storage system, at least one input device, and at least one output device. Each computer program may be implemented in a high-level procedural or object-oriented programming language, or in assembly or machine language if desired; and in any case, the language may be a compiled or interpreted language. Suitable processors include, by way of example, both general and special purpose microprocessors. Generally, a processor will receive instructions and data from a read-only memory and/or a random access memory. Storage devices suitable for tangibly embodying computer program instructions and data include all forms of non-volatile memory, including by way of example semiconductor memory devices, such as Erasable Programmable Read-Only Memory (EPROM), Electrically Erasable Programmable Read-Only Memory (EEPROM), and flash memory devices; magnetic disks such as internal hard disks and removable disks; magneto-optical disks; and Compact Disc Read-Only Memory (CD-ROM). Any of the foregoing may be supplemented by, or incorporated in, specially-designed ASICs (application-specific integrated circuits).

It will be understood that various modifications may be made without departing from the spirit and scope of the claims. For example, advantageous results still could be achieved if steps of the disclosed techniques were performed in a different order and/or if components in the disclosed systems were combined in a different manner and/or replaced or supplemented by other components. Accordingly, other implementations are within the scope of the following claims.

What is claimed is:

1. A computer-implemented method for establishing access controls, the method comprising:
   establishing a communication session between a user device located at a premise and a destination system, the communications session being established through an online access provider device configured to provide access to the destination system, and the premise comprising a physical location and being associated with a plurality of users recognized by the online access provider device, with corresponding access control levels;
   receiving a request for content associated with the destination system from the user device, the request comprising information identifying the user device and a requesting user associated with the user device;
   accessing information identifying the plurality of recognized users associated with the premise;
   determining, using a processor, whether the requesting user is associated with the premise, based on at least the information identifying the requesting user and the information identifying the plurality of recognized users;
   determining an access control level to apply to communications between the user device and the destination system, when the requesting user is determined not to be associated with the premise, the determining comprising:
      obtaining, from the received request, information identifying an access control level associated with the requesting user;
      comparing the access control level associated with the requesting user to access control levels associated with the recognized users; and
      selecting the access control level to apply to communications between the user device and the destination system, based on at least the comparison;
   applying, using a processor, the determined access control level to communications between the requesting user of the user device and the destination system; and
   automatically changing the determined access control level as the access control levels are changed for the recognized users.

2. The method of claim 1, wherein:
   determining the access control level further comprises determining a most restrictive access control level from among the access control level associated with the requesting user and the access control levels associated with the recognized users and the selecting comprises selecting the determined most restrictive access control level as the access control level to apply to the communications between the user device and the destination system.

3. The method of claim 2, further comprising automatically updating the most restrictive access control level to reflect changes made to the access control levels for at least a corresponding one of the recognized users.

4. The method of claim 1, wherein:
determining the access control level further determining a least restrictive access control level from among the access control level associated with the requesting user and the access control levels associated with the recognized users; and
the selecting comprises selecting the determined least restrictive access control level as the access control level to apply to the communications between the user device and the destination system.

5. The method of claim 1, wherein determining the access control level comprises selecting at least two access control levels from among the access control levels applied to the recognized users.

6. The method of claim 1, further comprising changing the access control levels for the recognized users from one level of classification to a different level of classification.

7. The method of claim 1, further comprising changing the access control levels for the recognized users from one level of classification of content to a different level of classification of content, based on age-appropriateness of the content.

8. The method of claim 1, wherein the access control levels include parental control levels.

9. The method of claim 1, wherein:
the destination system includes a host system; and
determining the access control level includes determining the access control level to apply at the host system.

10. The method of claim 1, wherein the online access provider device is distinct from the destination system.

11. The method of claim 1, wherein the online access provider device is related to the destination system.

12. The method of claim 1, wherein the online access provider device includes an Internet access provider device.

13. The method of claim 1, wherein the online access provider device includes an Internet service provider device.

14. The method of claim 1, claim 1 wherein the online access provider device includes a gateway server.

15. The method of claim 1, wherein:
establishing the communication session includes establishing the communication session between the user device and the destination system through a proxy located between the user device that initiates the communication session and the online Previously Presented provider device; and
determining the access control level includes determining the access control level to apply at the proxy.

16. The method of claim 15, wherein the proxy includes a home gateway device.

17. The method of claim 15, wherein the proxy is located on the user device.

18. The method of claim 15, wherein the proxy includes a client-side proxy.

19. The method of claim 15, further comprising storing the access control information associated with the recognized users on the proxy.

20. The method of claim 19, wherein:
the access control information associated with the recognized users includes parental control information; and
the storing comprises storing the parental control information on the proxy.

21. The method of claim 15, wherein applying the determined access control level includes using the proxy to apply the determined access control level to communications between the user device and the destination system.

22. The method of claim 21, further comprising appending the determined access control information to communications between the user device and the destination system.

23. The method of 15, wherein:
determining the access control level further comprises determining a most restrictive access control level from among the access control level associated with the requesting user and the access control levels associated with the recognized users at the proxy; and
the selecting comprises selecting the determined most restrictive access control level at the proxy as the access control level to apply to the communications between the user device and the destination system.

24. The method of claim 1, further comprising enabling a master account owner to override the access control levels applied to the recognized users.

25. The method of claim 1, wherein determining the access control level includes determining the access control level to apply at the user device.

26. The method of claim 1, further comprising notifying the requesting user of the applied access control level.

27. The method of claim 1, wherein:
the requesting user information comprises an identifier of the requesting user;
the information identifying the recognized users comprises identifiers corresponding to the recognized users; and
determining whether the requesting user is associated with the premise comprises:
using the user device information to identify the premise associated with the user device;
determining whether the requesting user identifier corresponds to one of the recognized user identifiers associated with the premise; and
determining that the requesting user is not associated with the premise, when the requested user identifier does not correspond to the recognized user identifiers.

28. The method of claim 27, wherein using the user device information to identify the premise includes referencing a table that includes a first entry that identifies the user device information, a second entry that identifies the premise associated with the user device information, and a third entry that identifies the recognized user identities associated with the premise.

29. The method of claim 27, wherein the user device information is appended to the request by the user device.

30. The method of claim 27, wherein the user device information is appended to the request by a proxy through which the user device communicates with the destination system.

31. A tangible, non-transitory computer-readable medium storing instructions that, when executed by a processor, cause the processor to perform a method for establishing access controls, the method comprising:
establishing a communication session between a user device located at a premise and a destination system, the communications session being established through an online access provider device configured to provide access to the destination system, and the premise comprising a physical location and being associated with a plurality of users recognized by the online access provider device, with corresponding access control levels;

receiving a request for content associated with the destination system from the user device, the request comprising information identifying the user device and a requesting user associated with the user device;

accessing information identifying the plurality of recognized users associated with the premise;

determining, using a processor, whether the requesting user is associated with the premise, based on at least the information identifying the requesting user and the information identifying the plurality of recognized users;

determining an access control level to apply to communications between the user device and the destination system, when the requesting user is determined not to be associated with the premise, the determining comprising:

obtaining, from the received request, information identifying an access control level associated with the requesting user;

comparing the access control level associated with the requesting user to the access control levels associated with the recognized users; and selecting the access control level to apply to communications between the user device and the destination system, based on at least the comparison;

applying, using a processor, the determined access control level to communications between the requesting user of the user device and the destination system; and automatically changing the determined access control level as the access control levels are changed for the recognized.

32. The computer-readable medium of claim 31, wherein:
determining the access control level further comprises determining a most restrictive access control level from among the access control level associated with the requesting user and the access control levels associated with the recognized users; and the selecting comprises selecting the determined most restrictive access control level as the access control level to apply to the communications between the user device and the destination system.

33. The computer-readable medium of claim 32, wherein the method further comprises automatically updating the most restrictive access control level to reflect changes made to the access control levels for at least a corresponding one of the recognized users.

34. The computer-readable medium of claim 31, wherein:
determining the access control level further comprises determining a least restrictive access control level from among the access control level associated with the requesting user and the access control levels associated with the recognized users; and the selecting comprises selecting the determined least restrictive access control level as the access control level to apply to the communications between the user device and the destination system.

35. The computer-readable medium of claim 31, wherein determining the access control level comprises selecting at least two access control levels from among the access control levels applied to the recognized users.

36. The computer-readable medium of claim 31, wherein the method further comprises changing the access control levels for the recognized users from one level of classification to a different level of classification.

37. The computer-readable medium of claim 31, wherein the method further comprises changing the access control levels for the recognized users from one level of classification of content to a different level of classification of content, based on age-appropriateness of the content.

38. The computer-readable medium of claim 31, wherein the access control levels include parental control levels.

39. The computer-readable medium of claim 31, wherein:
the destination system includes a host system; and
determining the access control level comprises determining the access control level to apply at the host system.

40. The computer-readable medium of claim 31, wherein the online access provider device is distinct from the destination system.

41. The computer-readable medium of claim 31, wherein the online access provider device is related to the destination system.

42. The computer-readable medium of claim 31, wherein the online access provider device includes an Internet access provider device.

43. The computer-readable medium of claim 31, wherein the online access provider device includes an Internet service provider device.

44. The computer-readable medium of claim 31, wherein the online access provider device includes a gateway server.

45. The computer-readable medium of claim 31, wherein:
establishing the communication session includes establishing the communication session between the user device and the destination system through a proxy located between the user device that initiates the communication session and the online access provider device; and determining the access control level includes determining the access control level to apply at the proxy.

46. The computer-readable medium of claim 45, wherein the proxy includes a home gateway device.

47. The computer-readable medium of claim 45, wherein the proxy is located on the user device.

48. The computer-readable medium of claim 45, wherein the proxy includes a client-side proxy.

49. The computer-readable medium of claim 45, wherein the method further comprises storing the access control information associated with the recognized users on the proxy.

50. The computer-readable medium of claim 49, wherein:
the access control information associated with the recognized users includes parental control information such that; and
the storing comprises storing the parental control information on the proxy.

51. The computer-readable medium of claim 45, wherein applying the determined access control level comprises using the proxy to apply the determined access control level to communications between the user device and the destination system.

52. The computer-readable medium of claim 51, wherein the method further comprises appending the determined access control information to communications between the user device and the destination system.

53. The computer-readable medium of claim 45, wherein:
determining the access control level further comprises determining a most restrictive access control level from among the access control level associated with the requesting user and the access control levels associated with the recognized users at the proxy; and the selecting comprises selecting the determined most restrictive access control level at the proxy as the access control level to apply to the communications between the user device and the destination system.

54. The computer-readable medium of claim 30, wherein the method further comprises enabling a master account owner to override the access control levels applied to the recognized users.

55. The computer-readable medium of claim 31, wherein determining the access control level includes determining the access control level to apply at the user device.

56. The computer-readable medium of claim 31, wherein the method further comprises notifying the requesting user of the applied access control level.

57. The computer-readable medium of claim 31, wherein:
the requesting user information comprises an identifier of the requesting user;
the information identifying the recognized users comprises identifiers corresponding to the recognized users; and
determining whether the requesting user is associated with the premise comprises:
    using the user device information to identify the premise associated with the user device;
    determining whether the requesting user identifier corresponds to one of the recognized user identifiers associated with the premise; and
    determining that the requesting user is not associated with the premise, when the received user identifier does not correspond to the recognized user identifiers.

58. The computer-readable medium of claim 57, wherein using the user device information to identify the premise comprises referencing a table that includes a first entry that identifies the user device information, a second entry that identifies the premise associated with the user device information, and a third entry that identifies the recognized user identities associated with the premise.

59. The computer-readable medium of claim 57, wherein the user device information is appended to the request by the user device.

60. The computer-readable medium of claim 57, wherein the user device information is appended to the request by a proxy through which the user device communicates with the destination system.

61. A system for establishing access controls, comprising:
means for establishing a communication session between a user device located at a premise and a destination system, the communications session being established through an online access provider device configured to provide access to the destination system, and the premise comprising a physical location and being associated with a plurality of users recognized by the online access provider device with corresponding access control levels;
means for receiving a request for content associated with the destination system from the user device, the request comprising information identifying the user device and a requesting user associated with the user device;
means for accessing information identifying the plurality of recognized users associated with the premise;
first determining means for determining whether the requesting user is associated with the premise, based on at least the information identifying the requesting user and the information identifying the plurality of recognized users;
second determining means for determining an access control level to apply to communications between the user device and the destination system, when the requesting user is determined not to be associated with the premise, the second determining means comprising:
    means for obtaining, from the received request, information identifying an access control level associated with the requesting user;
    means for comparing the access control level associated with the requesting user to the access control levels associated with the recognized users; and
    means for selecting the access control level to apply to communications between the user device and the destination system, based on at least the comparison;
means for applying the determined access control level to communications between the requesting user of the user device and the destination system; and
means for automatically changing the determined access control level as the access control levels are changed for the recognized users.

62. The system of claim 61, wherein:
the second determining means further comprises means for determining a most restrictive access control level from among the access control level associated with the requesting user and the access control levels associated with the recognized users; and
the means for selecting comprises means for selecting the determined most restrictive access control level as the access control level to apply to the communications between the user device and the destination system.

63. The system of claim 62, further comprising means for automatically updating the most restrictive access control level to reflect changes made to the access control levels for at least a corresponding one of the recognized users.

64. The system of claim 61, wherein:
the second determining means further comprises means for determining a least restrictive access control level from among the access control level associated with the requesting user and the access control levels associated with the recognized users; and
the means for selecting comprises means for selecting the determined least restrictive access control level as the access control level to apply to the communications between the user device and the destination system.

65. The system of claim 61, wherein the second determining means comprises means for selecting at least two access control levels from among the access control levels applied to the recognized users.

66. The system of claim 61, further comprising means for changing the access control levels for the recognized users from one level of classification to a different level of classification.

67. The system of claim 61, further comprising means for changing the access control levels for the recognized users from one level of classification of content to a different level of classification of content, based on age-appropriateness of the content.

68. The system of claim 61, wherein the access control levels include parental control levels.

69. The system of claim 61, wherein the destination system includes a host system and the second determining means includes means for determining the access control level to apply at the host system.

70. The system of claim 61, wherein the online access provider device is distinct from the destination system.

71. The system of claim 61, wherein the online access provider device is related to the destination system.

72. The system of claim 61, wherein the online access provider device includes an Internet access provider device.

73. The system of claim 61, wherein the online access provider device includes an Internet service provider device.

74. The system of claim 61, wherein the online access provider device includes a gateway server.

75. The system of claim 61, wherein:
- the means for establishing the communication session includes establishing the communication session between the user device and the destination system through a proxy located between the user device that initiates the communication session and the online access provider device; and
- the second determining means includes means for determining the access control level to apply at the proxy.

76. The system of claim 75, wherein the proxy includes a home gateway device.

77. The system of claim 75, wherein the proxy is located on the user device.

78. The system of claim 75, wherein the proxy includes a client-side proxy.

79. The system of claim 75, further comprising means for storing the access control information associated with the recognized users on the proxy.

80. The system of claim 79 wherein:
- the access control information associated with the recognized users includes parental control information such that; and
- the means for storing the access control information includes means for storing the parental control information on the proxy.

81. The system of claim 75, wherein the second determining means includes means for using the proxy to apply the determined access control level to communications between the user device and the destination system.

82. The system of claim 81, further comprising means for appending the determined access control information to communications between the user device and the destination system.

83. The system of claim 75, wherein:
- the second determining means further comprises means for determining a most restrictive access control level from among the access control level associated with the requesting user and the access control levels associated with the recognized users at the proxy; and
- the means for selecting means for selecting the determined most restrictive access control level at the proxy as the access control level to apply to the communications between the user device and the destination system.

84. The system of claim 61, further comprising means for enabling a master account owner to override the access control levels applied to the recognized users.

85. The system of claim 61, wherein the second determining means includes means for determining the access control level to apply at the user device.

86. The system of claim 61, further comprising means for notifying the requesting user of the applied access control level.

87. The system of claim 61, wherein:
- the requesting user information comprises an identifier of the requesting user;
- the information identifying the recognized users comprises identifiers corresponding to the recognized users; and
- the first determining means includes:
  - means for using the user device information to identify the premise associated with the user device;
  - means for determining whether the received user identifier corresponds to one of the recognized user identifiers associated with the premise; and
  - means for determining that the requesting user is not associated with the premise, when the requesting user identifier does not correspond to the recognized user identifiers.

88. The system of claim 87, wherein means for using the user device information to identify the premise includes referencing a table that includes a first entry that identifies the user device information, a second entry that identifies the premise associated with the user device information, and a third entry that identifies the recognized user identities associated with the premise.

89. The system of claim 87, wherein the user device information is appended to the request by the user device.

90. The system of claim 87, wherein the user device information is appended to the request by a proxy through which the user device communicates with the destination system.

* * * * *

UNITED STATES PATENT AND TRADEMARK OFFICE
CERTIFICATE OF CORRECTION

PATENT NO. : 8,468,578 B1
APPLICATION NO. : 10/330542
DATED : June 18, 2013
INVENTOR(S) : Larry L. Lu et al.

Page 1 of 1

It is certified that error appears in the above-identified patent and that said Letters Patent is hereby corrected as shown below:

In the Claims

Claim 50, Col. 22, Line 47-48, "such that" should be deleted.

Claim 80, Col. 25, Line 23-24, "such that" should be deleted.

Signed and Sealed this
Twentieth Day of August, 2013

Teresa Stanek Rea
*Acting Director of the United States Patent and Trademark Office*